United States Patent
Liu

(10) Patent No.: US 11,875,014 B2
(45) Date of Patent: Jan. 16, 2024

(54) ICON ARRANGEMENT METHOD, ELECTRONIC DEVICE, AND STORAGE MEDIUM

(71) Applicant: VIVO MOBILE COMMUNICATION CO., LTD., Dongguan (CN)

(72) Inventor: Quancai Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 17/993,213

(22) Filed: Nov. 23, 2022

(65) Prior Publication Data

US 2023/0091611 A1  Mar. 23, 2023

Related U.S. Application Data

(63) Continuation of application No. PCT/CN2021/095114, filed on May 21, 2021.

(30) Foreign Application Priority Data

May 25, 2020 (CN) .......................... 202010448095.9

(51) Int. Cl.
G06F 3/04817 (2022.01)
G06F 3/0488 (2022.01)

(52) U.S. Cl.
CPC ........ G06F 3/04817 (2013.01); G06F 3/0488 (2013.01)

(58) Field of Classification Search
CPC .. G06F 3/04817; G06F 3/0488; G06F 3/0483; G06F 3/04842
See application file for complete search history.

(56) References Cited

U.S. PATENT DOCUMENTS

| | | | | |
|---|---|---|---|---|
| 2011/0271182 A1* | 11/2011 | Tsai | ...................... | G06F 3/0488 715/702 |
| 2012/0084692 A1* | 4/2012 | Bae | ...................... | G06F 3/0486 715/769 |
| 2012/0166987 A1* | 6/2012 | Kang | .................... | G06F 3/0483 715/765 |

(Continued)

FOREIGN PATENT DOCUMENTS

| | | |
|---|---|---|
| CN | 104020931 A | 9/2014 |
| CN | 104298419 A | 1/2015 |

(Continued)

OTHER PUBLICATIONS

China National Intellectual Property Administration, International Search Report issued in corresponding Application No. PCT/CN2021/095114, dated Aug. 25, 2021.

(Continued)

*Primary Examiner* — Mong-Shune Chung
(74) *Attorney, Agent, or Firm* — Stites & Harbison, PLLC; Jeffrey A. Haeberlin

(57) ABSTRACT

Disclosed in this application are an icon arrangement method, an electronic device, and a storage medium. The method includes: receiving a first input performed by a user in a case that a first icon is displayed; and displaying first index information of the first icon in response to the first input and updating a display position of the first icon to a position corresponding to the first index information.

18 Claims, 9 Drawing Sheets

(56) References Cited

U.S. PATENT DOCUMENTS

| | | | | |
|---|---|---|---|---|
| 2015/0378707 A1* | 12/2015 | Park | ............ | G06F 3/0482 |
| | | | | 717/174 |
| 2016/0028907 A1* | 1/2016 | Kato | ............ | H04N 1/00477 |
| | | | | 358/1.13 |
| 2022/0197482 A1* | 6/2022 | Zhu | ............ | G06F 3/0481 |

FOREIGN PATENT DOCUMENTS

| | | | |
|---|---|---|---|
| CN | 104360805 | A | 2/2015 |
| CN | 105739887 | A | 7/2016 |
| CN | 109933252 | A | 6/2019 |
| CN | 109960445 | A | 7/2019 |
| CN | 109976607 | A | 7/2019 |
| CN | 111459350 | A | 7/2020 |
| JP | 2012-9009 | A | 1/2012 |
| JP | 2014-102656 | A | 6/2014 |

OTHER PUBLICATIONS

European Patent Office, Extended European Search Report issued in corresponding Application No. EP 21 81 2370, dated Oct. 23, 2023.

* cited by examiner

ICON ARRANGEMENT METHOD, ELECTRONIC DEVICE, AND STORAGE MEDIUM

CROSS-REFERENCE TO RELATED APPLICATIONS

This application is a continuation of International Application No. PCT/CN2021/095114, filed on May 21, 2021, which claims priority to Chinese Patent Application No. 202010448095.9 filed in China on May 25, 2020, which is incorporated herein by reference in its entirety.

TECHNICAL FIELD

This application relates to the field of communications technologies, and in particular, to an icon arrangement method, an electronic device, and a storage medium.

BACKGROUND

A plurality of application icons are often displayed on a desktop of an electronic device such as a mobile phone. An application can be opened by clicking on an application icon. During use, a user will often adjust a display position of an icon according to different usage habits of the user or during installation of a new application.

In the related art, the user may touch and hold and drag the icon to move the display position of the icon. However, the operation mode of touching and holding and dragging icons is complicated, especially in the scene of moving icons across pages. During the dragging, it is easy to mistakenly trigger other icons on the dragging path to change the display position, which increases the operation duration. In addition, only one icon can be moved at a time by touching and holding and dragging. When a plurality of icons need to be moved, each icon needs to be touched and held and dragged separately, which increases the complexity of the operation.

It may be learned from the above that the process of adjusting the display position of the icon in the related art increases the complexity of the operation.

SUMMARY

According to a first aspect of this application, an icon arrangement method is provided, which includes:
  receiving a first input performed by a user in a case that a first icon is displayed; and
  displaying first index information of the first icon in response to the first input and updating a display position of the first icon to a position corresponding to the first index information.

According to a second aspect of this application, an electronic device is provided, which includes:
  a first receiving module, configured to receive a first input performed by a user in a case that a first icon is displayed; and
  a first response module, configured to display first index information of the first icon in response to the first input and update a display position of the first icon to a position corresponding to the first index information.

According to a third aspect of this application, an electronic device is provided, which includes a memory, a processor and a computer program stored on the memory and executable on the processor, where when the computer program is executed by the processor, the steps of the icon arrangement method according to the first aspect of this embodiment of this application are implemented.

According to a fourth aspect of this application, a computer-readable storage medium is provided, which has a computer program stored thereon, where when the computer program is executed by a processor, the steps of the icon arrangement method according to the first aspect of this embodiment of this application are implemented.

According to a fifth aspect of this application, a computer software product, stored in a non-volatile storage medium, is provided, where the software product is configured to be executed by at least one processor to implement the steps of the icon arrangement method provided in the first aspect of the embodiment of this application.

According to a sixth aspect of this application, an electronic device is provided, which is configured to perform the icon arrangement method provided in the first aspect of the embodiment of this application.

BRIEF DESCRIPTION OF THE DRAWINGS

To describe the technical solutions in the embodiments of this application more clearly, the following briefly describes the accompanying drawings required for describing the embodiments or the related art. Apparently, the accompanying drawings in the following description show merely some embodiments of this application, and a person of ordinary skill in the art may derive other drawings from the accompanying drawings without creative efforts.

DETAILED DESCRIPTION

The technical solutions in the embodiments of this application are clearly described in the following with reference to the accompanying drawings in the embodiments of this application. Apparently, the described embodiments are some rather than all of the embodiments of this application. All other embodiments obtained by a person of ordinary skill in the art based on the embodiments of this application without creative efforts shall fall within the protection scope of this application.

According to an icon arrangement method provided in the embodiment of this application, display positions of one or more icons displayed on an electronic device can be simply adjusted, and the operation complexity of adjusting the display position of the icon can be reduced.

The icon arrangement method provided in the embodiment of this application can be applied to the electronic device. During specific implementation, the electronic device may be an electronic device such as a mobile phone, a tablet personal computer (Tablet Personal Computer), a laptop computer (Laptop Computer), a personal digital assistant (personal digital assistant, PDA), a mobile Internet device (Mobile Internet Device, MID), a wearable device (Wearable Device), a computer, a notebook computer, or the like.

Figure 1:
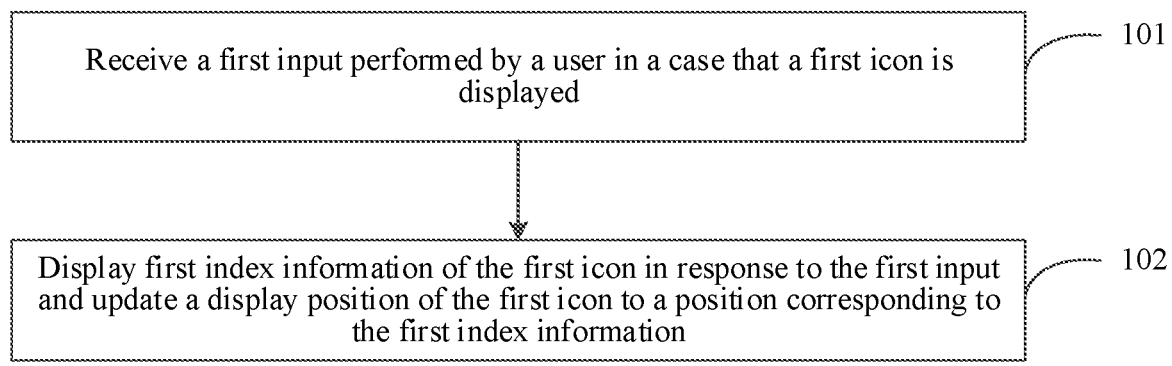
FIG. 1 is a flowchart of an icon arrangement method according to an embodiment of this application.

Referring to FIG. 1, FIG. 1 is a flowchart of an icon arrangement method according to an embodiment of this application. The method is applied to an electronic device. As shown in FIG. 1, the method may include the following steps.

Step 101: Receive a first input performed by a user in a case that a first icon is displayed.

Step 102: Display first index information of the first icon in response to the first input and update a display position of the first icon to a position corresponding to the first index information.

During specific implementation, the first index information may include any one or more characters such as a text, a digit, a letter, and the like, and the characters such as the text, the digit, the letter, and the like may indicate the display position of the first icon and correspond to the display position of the first icon. For example, if the first index information is "1-1-2", the first index information corresponds to a first icon arranged in a first row and a first column on a first page of an electronic device.

In addition, the first icon may be one or more icons. For example, if the first index information is "1-1", the display position corresponding to the first index information is a first row of a first page of a desktop of an electronic device. In addition, if the first icon includes 4 icons, when the display position of the first icon is updated to the position corresponding to the first index information, the 4 icons may be arranged in the first row of the first page of the desktop of the electronic device in a preset order.

In addition, the first input may be used for inputting new index information, for example, inputting the first index information in a character form in an input box. In addition, during specific implementation, the first input may further be an update input performed on the index information corresponding to a current display position of the first icon. For example, while the first icon is displayed, the second index information of the first icon is also displayed. The second index information is index information corresponding to the current display position of the first icon, and virtual buttons "+" and "−" may be further displayed on the left and right or on the top and bottom of the index information. Therefore, the first input is a touch operation on the virtual button. Alternatively, in a case that the user touches the virtual button "+", a corresponding identifier (for example, a row identifier, a column identifier, a page identifier, and so on) in the second index information can be added, thereby adjusting the second index information to the first index information. Optionally, in a case that the first icon and the second index information are displayed, a first input performed by a user on the second index information is received. The first input may further be an editing and updating operation of the user on the second index information. For example, the second index information is "1-1-1". The user can click the index information and change the index information to "1-1-2" to update the second index information to the first index information.

Optionally, the first index information may be used for representing position information, such as coordinate information, or may be used for representing coordinate offset information.

In addition, the displaying the first index information of the first icon may be displaying complete index information of the first icon or may be displaying adjustment information of the first icon. For example, in a case that the index information of the first icon includes a row identifier, position offset information of "+1" (that is, move up by one row) or "−1" (that is, move down by one row) may be displayed.

As an alternative implementation, the first index information includes at least one of a page identifier, a row identifier, a column identifier, an icon identifier, or a folder identifier.

During specific implementation, the page identifier, the row identifier, the column identifier, the icon identifier, and the folder identifier may be digits, letters, symbols, and so on, which are not Alternatively limited herein. The page identifier is associated with a page on which the first icon is displayed. The row identifier is associated with a row on which the first icon is displayed. The column identifier is associated with a column on which the first icon is displayed. The icon identifier is associated with an icon associated with the first icon. The folder identifier is associated with a folder on which the first icon is displayed.

Alternatively, the desktop of the electronic device may include a plurality of pages, and currently displayed pages of the electronic device may be switched by sliding the pages transversely. The page identifier may be associated with the page on which the first icon is displayed. For example, if the first icon is displayed on page 1, the page identifier may be a digit 1.

In addition, a plurality of icons may be displayed on each page, and the icons on the same page may be arranged. For example, if icons with 6 rows and 4 columns are displayed on the page shown in FIG. 2, index information display areas may be set before first places of each column and each row, so as to display index information display areas such as a row identifier display area 21 and a column identifier display area 22 in the area. The row identifier may be displayed in the row identifier display area 21, and the column identifier may be displayed in the column identifier display area 22. For example, if a row identifier of an icon on page 1 arranged in row 2 and column 3 is a digit 2 and a column identifier of the icon is a digit 3, index information of the icon is "1-2-3"; if a row identifier of 4 icons on page 1 arranged in row 2 is the digit 2, index information of the row of icons is 1-2; and if a column identifier of 6 icons on page 1 arranged in column 3 is the digit 3, index information of the column of icons is 1-3.

For another example, when display positions of more than 2 rows of icons are moved, a row identifier of each to-be-edited row may be edited. Alternatively, if the icons in row 1 are to be moved to row 3, the icons in row 3 are to be moved to row 5, and the icons in row 5 are to be moved to row 1, index information of the icons in row 1 is changed to "1-3", index information of the icons in row 3 is changed to "1-5", and index information of the icons in row 5 is changed to "1-1".

It should be noted that in this implementation, a row of icons can be moved as a whole. In this case, only the row identifier of icons arranged in the same row needs to be modified. In addition, a column of icons may further be moved as a whole. In this case, only the column identifier of icons arranged in the same column needs to be modified.

In addition, the icons on the page may include folder icons, and each folder icon may be clicked to open the folder to display the icons in the folder. For example, if 6 icons are displayed in the folder shown in FIG. 3, and the 6 icons are arranged in 2 rows and 4 columns, the icon arranged in row 2 and column 1 in the folder has a folder identifier F, a row identifier being a digit 2, and a column identifier being a digit 1. It should be noted that during specific implementation, the folder identifier may further be other characters or letters in other forms, which is not specifically limited herein.

Certainly, the above first index information may further be index information in other forms, and an index rule may be set in advance to associate the index information with the display position of the first icon, which is not specifically limited herein.

The icon arrangement method provided in the embodiment of this application includes: receiving a first input performed by a user in a case that a first icon is displayed; and displaying first index information of the first icon in response to the first input and updating a display position of the first icon to a position corresponding to the first index information. In this way, the first index information corresponding to the display position of the first icon can be updated through the first input, thereby changing the display position of the first icon. The process of arranging icons is simple and accurate.

As an alternative implementation, the receiving a first input performed by a user in a case that a first icon is displayed includes:
  receiving a first input performed by a user on second index information in a case that the first icon and the second index information are displayed, where the second index information is associated with a current display position of the first icon; and
  the displaying first index information of the first icon in response to the first input and updating a display position of the first icon to a position corresponding to the first index information includes:
  updating the second index information to the first index information in response to the first input and updating the display position of the first icon to the position corresponding to the first index information.

Figure 5A:
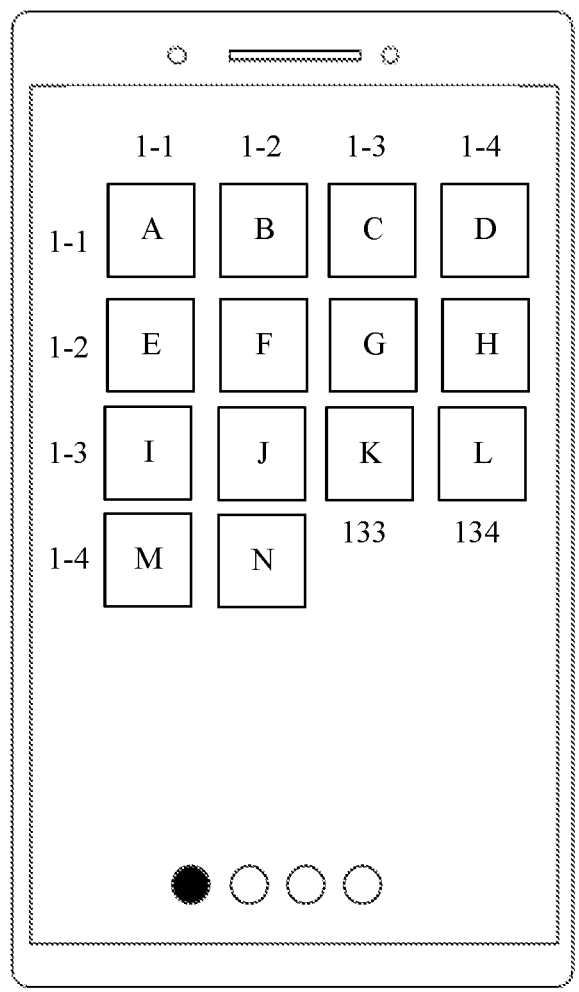
FIG. 5*a* is an application scenario diagram III of an icon arrangement method according to an embodiment of this application.
Figure 5B:
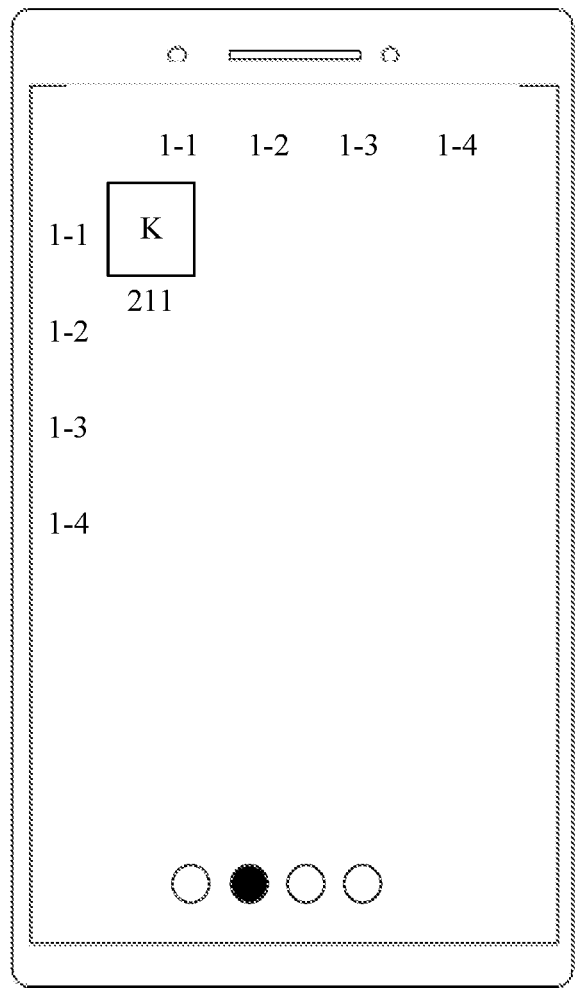
FIG. 5*b* is an application scenario diagram IV of an icon arrangement method according to an embodiment of this application.

During specific implementation, the first input may be an operation of modifying, editing, and dragging the second index information to obtain the first index information according to the content of the first input. For example, FIG. 5a shows an initial display interface. When a user executes a first input to modify, to the first index information "2-1-1", second index information "1-3-4" of an icon K displayed on the first page of the electronic device and arranged in the third row and the third column, a display interface as shown in FIG. 5b is displayed in response to the first input. The icon K on the interface is displayed at a display position of a first row and a first column on a second page.

In this implementation, the second index information of the first icon is displayed, and the first input is an input for the second index information, so as to modify the second index information to the first index information, so that the first icon is displayed at the display position corresponding to the modified first index information. In this way, the user can learn a positional relationship between the second index information and the first index information during arrangement of icons, so that the index information of the first icon can be edited more accurately, so as to accurately move the first icon to the display position to which the user wants to move the icon, thereby improving the operation convenience of the icon arrangement method.

As an alternative implementation, the displaying first index information of the first icon in response to the first input and updating a display position of the first icon to a position corresponding to the first index information includes:
  displaying third index information of the first icon in response to the first input;
  outputting prompt information in a case that a second icon is displayed at a display position corresponding to the third index information or the third index information corresponds to display positions of L first icons, where L is an integer greater than 1;
  updating the third index information to the first index information and updating the display position of the first icon to the position corresponding to the first index information;
  or
  displaying the first index information of the first icon in response to the first input; and
  adjusting a display position of a second icon and updating the display position of the first icon to the position corresponding to the first index information in a case that the second icon is displayed at a display position corresponding to the first index information.

During specific implementation, in a case that the display position corresponding to the third index information is a row, the second icon being displayed at the display position corresponding to the third index information may mean that one or more icons have been displayed in the row corresponding to the third index information. Similarly, in a case that the display position corresponding to the third index information is a column, the second icon being displayed at the display position corresponding to the third index information may mean that one or more icons have been displayed in the column corresponding to the third index information.

In this way, in a case that an icon exists at the position corresponding to the third index information, the prompt information may be used for promoting that the third index information inputted by the user and an associated display position have repeated icons, or prompting that the user inputs repeated third index information. For example, when an icon is displayed at the display position associated with the index information of "1-2", if the user modifies index information of another icon to "1-2", prompt information may be outputted to prompt that the index information edited by the user is wrong. In addition, during specific implementation, the user may modify display positions of a plurality of icons in batches on the position editing interface, and when the user modifies the index information of two different icons to the same index information, prompt information may be outputted to prompt that the index information edited by the user has repeated errors.

Optionally, after the prompt information is outputted, the input performed by the user may be received, and the third index information is updated to the first index information in response to the input performed by the user.

It should be noted that during specific implementation, the adjusting a display position of a second icon may be adjusting the display position of the second icon to the display position of the first icon before being moved, so that the display position of the first icon can be exchanged with the display position of another icon.

In addition, the adjusting a display position of a second icon may further be displaying the second icon at a first unoccupied display position after a current display position of the second icon.

In this implementation, in a case that the edited index information is repeated or the display positions of other icons overlap, the prompt information is outputted to prompt the user to modify the third index information to the first index information, thereby reducing the probability of user misoperation and improving the reliability of the icon arrangement method. Alternatively, in a case that the edited index information and the display positions of other icons overlap, the display positions of other icons are adjusted to prevent a plurality of icons from corresponding to the same display position.

Figure 2:
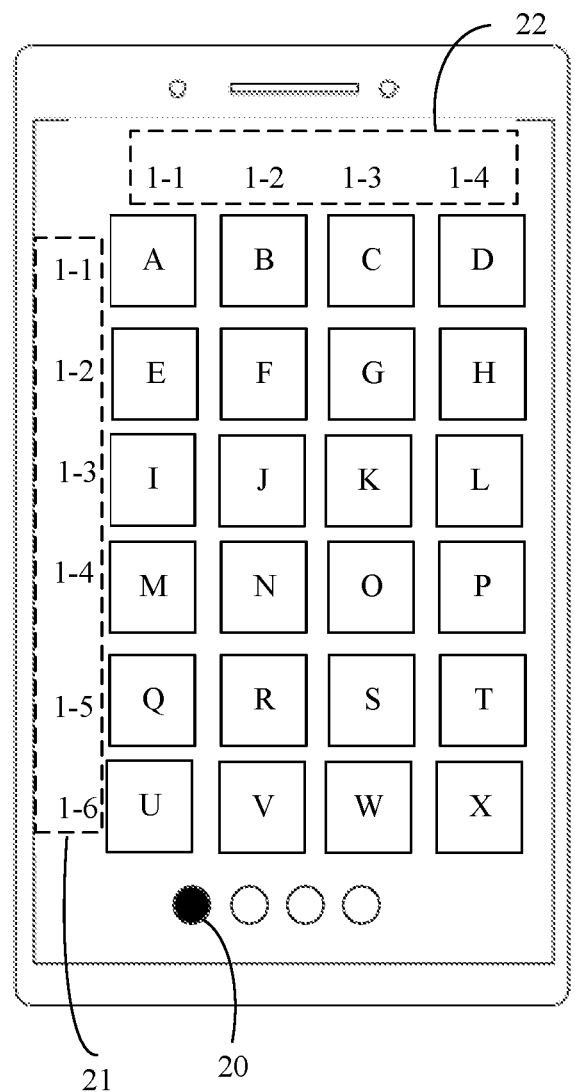
FIG. 2 is an application scenario diagram I of an icon arrangement method according to an embodiment of this application.

During specific implementation, in a case that the third index information has no associated display position, prompt information may also be outputted. For example, a maximum of 6 rows and 4 columns of icons can be displayed on the page as shown in FIG. 2. If the row identifier of the third index information is greater than 6 or the column identifier is greater than 4, prompt information is outputted to prompt the user that the third index information has no associated display position.

Figure 4:
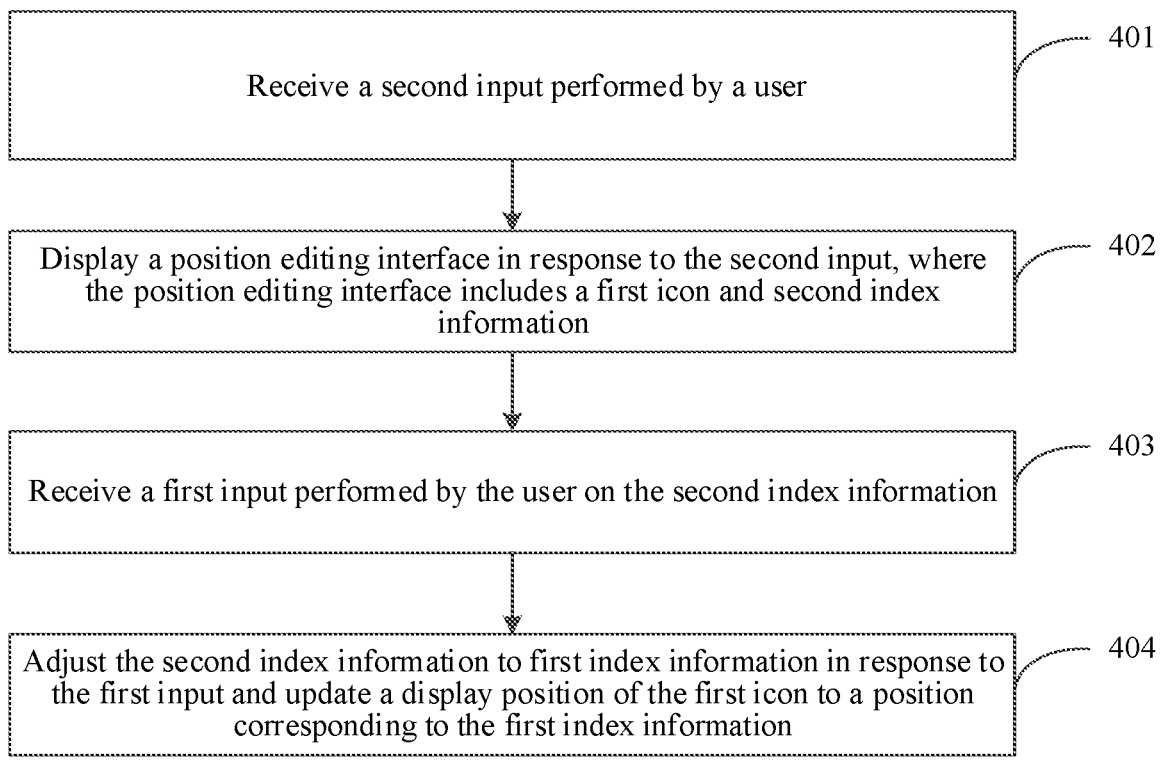
FIG. 4 is another flowchart of an icon arrangement method according to an embodiment of this application.

Referring to FIG. 4, FIG. 4 is another flowchart of an icon arrangement method according to an embodiment of this application. The method is applied to an electronic device. As shown in FIG. 4, the method may include the following steps.

Step 401: Receive a second input performed by a user.

During specific implementation, the second input may be a touch operation for a blank area of a desktop of an electronic device, for example, touching and holding, double tapping, or two-finger pinching, or may be a pressing operation for a switch button arranged on the electronic device, which is not specifically limited herein.

Step 402: Display a position editing interface in response to the second input, where the position editing interface includes a first icon and second index information.

During specific implementation, the index information of each icon may be displayed on the position editing interface. For example, as shown in FIG. 5a, the index information of an icon K is "133", the index information of an icon L is "134", and so on. The first digit in the index information is a page identifier, the second digit is a row identifier, and the third digit is a column identifier. Besides, index information of each row of icons and each column of icons may be displayed on the position editing interface. For example, as shown in FIG. 2, the index information of a second row of icons (including an icon E, an icon F, an icon G, and an icon H) is "1-2". The first digit in the index information is a page identifier, and the second digit is a row identifier. Besides, the index information of a second column of icons (including an icon B, an icon F, an icon J, and an icon N) is "1-2". The first digit in the index information is a page identifier, and the second digit is a column identifier.

Figure 3:
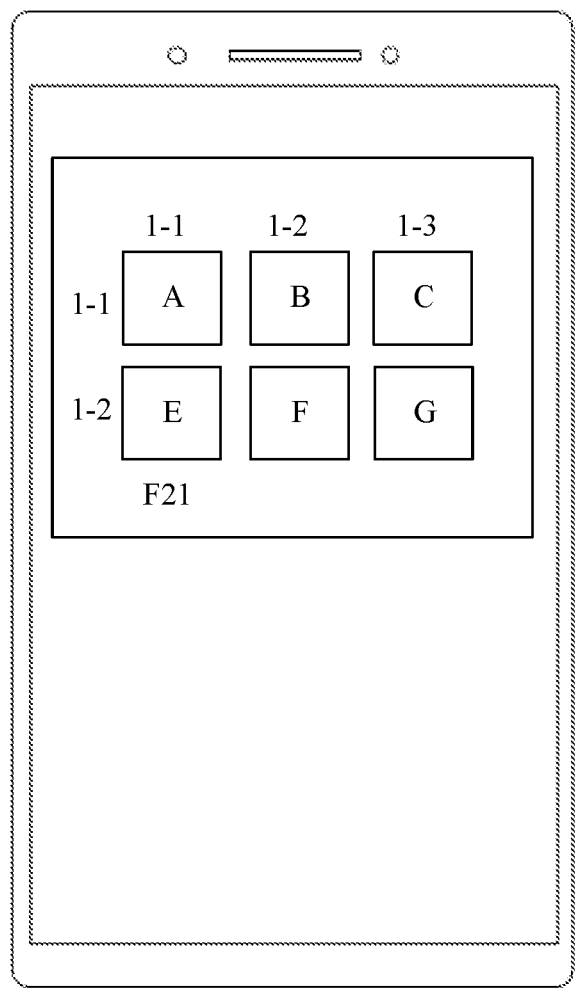
FIG. 3 is an application scenario diagram II of an icon arrangement method according to an embodiment of this application.

In addition, during specific implementation, when a folder icon is displayed on the desktop of the electronic device, the folder icon is clicked on the position editing interface to open the folder and display the index information of each icon in the folder. For example, on the position editing interface as shown in FIG. 5a, the icon K corresponding to the index information "133" is a folder icon, and after the user clicks the folder icon K, the position editing interface of the folder as shown in FIG. 3 is displayed. The folder includes 6 icons, and the index information of at least one of each icon, each row of icons, and each column of icons may be displayed. Alternatively, the index information associated with an icon C in the folder in row 1 and column 3 is "F13".

It should be noted that during specific implementation, the index information may further be index information in the form of a letter, a character, and so on, and the digit, the letter, or the character at different positions may be associated with any one of the page identifier, the row identifier, the column identifier, and the folder identifier to indicate the page, the row, or the column of the display position associated with the index information, which is not specifically limited herein.

Step 403: Receive a first input performed by the user on the second index information.

During specific implementation, the first input has the same meaning and functions as the first input in the embodiment shown in FIG. 1, and the details are not described herein again.

Step 404: Adjust the second index information to first index information in response to the first input and update a display position of the first icon to a position corresponding to the first index information.

As an alternative implementation, the displaying first index information of the first icon in response to the first input and updating a display position of the first icon to a position corresponding to the first index information includes:

displaying a first row identifier or a first column identifier of the first icon in response to the first input and updating display positions of M first sub-icons displayed in a same row to positions corresponding to the first row identifier in a case that the first icon includes the M first sub-icons, where M is an integer greater than 1; and displaying a first column identifier of the first icon and updating display positions of N first sub-icons displayed in a same column to positions corresponding to the first column identifier in a case that the first icon includes the N first sub-icons, where N is an integer greater than 1.

During specific implementation, the display position associated with the row identifier is the row indicated by the row identifier, and the display position associated with the column identifier is the column indicated by the column identifier.

In an implementation, in a case that the first icon includes M first sub-icons displayed in the same row, if the display positions of the M first sub-icons are updated to the positions corresponding to the first row identifier, the M first sub-icons may be displayed in the row associated with the first row identifier in the arrangement order of the M first sub-icons located in the same row. Alternatively, the M first sub-icons may further be displayed in the row associated with the first row identifier in a reverse order or out of order of the arrangement order of the M first sub-icons, which is not specifically limited herein.

In an implementation, in a case that the first icon includes M first sub-icons displayed in the same row, if the display positions of the M first sub-icons are updated to the positions corresponding to the first column identifier, the M first sub-icons may be displayed in the column associated with the first column identifier in the arrangement order of the M first sub-icons located in the same row. For example, if an icon A, an icon B, and an icon C located in the same row are arranged from left to right, then the icon A, the icon B, and the icon C may be successively arranged from top to bottom in the column corresponding to the first column identifier after the index information of the row of icons is updated to the first column identifier. Certainly, the M first sub-icons may further be displayed in the column associated with the first column identifier in the reverse order or out of order of the arrangement order of the M first sub-icons, which is not specifically limited herein.

In addition, the implementation of updating the display positions of N first sub-icons displayed in the same column to the positions corresponding to the first column identifier in a case that the first icon includes the N first sub-icons is similar to the implementation of updating the display positions of M first sub-icons displayed in the same row to the positions corresponding to the first row identifier in a case that the first icon includes the M first sub-icons. The details are not described herein again.

Moreover, during specific implementation, the N sub-icons arranged in the same row may further be moved to one column for display, or the N sub-icons arranged in the same column are moved to one row for display. The details are not described herein again.

It should be noted that, the adjustment of the second index information to the first index information may include updating the row identifier or the column identifier, and may further include adjusting at least one of the page identifier and the folder identifier to move a row of icons on one page to another page, and moving a row of icons in one folder to another folder or to the desktop.

In this implementation, the row identifiers and the column identifiers of a plurality of icons located in the same row or the same column are edited to move the plurality of icons as a whole, thereby avoiding editing the display positions of the plurality of icons separately, and simplifying the complexity of operation during simultaneous arrangement of the plurality of icons.

As an alternative implementation, the second index information includes a first folder identifier, and a display position corresponding to the second index information is located inside a first folder corresponding to the first folder identifier.

The updating the second index information to the first index information in response to the first input includes:
  adjusting the first folder identifier in the second index information in response to the first input, to obtain the first index information, where a display position corresponding to the first index information is outside the first folder.

During specific implementation, the first folder identifier is used for being associated with the first folder. For example, if a title of the first folder is "X", the first folder identifier may be "X".

Alternatively, the first folder identifier is used for indicating that the first icon is an icon in the folder instead of an icon displayed on the desktop. For example, the icon in the folder carries the folder identifier "F".

In an implementation, the adjusting the first folder identifier in the second index information may include deleting the first folder identifier in the second index information. The expression "the display position corresponding to the first index information is outside the first folder" may mean that the display position corresponding to the first index information is located on the desktop of the electronic device.

In this implementation, the icons in the folder can be moved to the desktop for display, and the operation is convenient.

In another implementation, the adjusting the first folder identifier in the second index information may include adjusting the first folder identifier to a second folder identifier. The display position corresponding to the first index information being outside the first folder may mean that the display position corresponding to the first index information is located in a second folder corresponding to the second folder identifier.

In this implementation, the icons in the first folder can be moved to the second folder.

As an alternative implementation, the adjusting the second index information to the first index information in response to the first input and updating a display position of the first icon to a position corresponding to the first index information includes:
  adjusting the second index information to the first index information in response to the first input;
  receiving a third input for the position editing interface; and
  displaying the first icon at a display position in a desktop corresponding to the first index information in response to the third input.

During specific implementation, the third input is used for exiting the position editing interface. Alternatively, the third input may be an input operation such as clicking the blank space of the desktop, clicking the back button, clicking the HOME key, and so on. In addition, upon exiting of the position editing interface, the electronic device may display the desktop and display icons in the desktop according to the display position after position editing.

In this implementation, after exiting the position editing interface, the first icon is displayed on the desktop according to the display position associated with the first index information, and the display positions of a plurality of icons may be edited separately on the position editing interface. Upon completion of editing, the icons are displayed on the desktop according to the edited position, thus avoiding the process of entering the editing interface, editing, and then exiting the editing interface for each to-be-edited icon, and simplifying the operation complexity of editing the display positions of the plurality of icons.

During specific implementation, a paging point may further be displayed on the position editing interface. The paging point indicates that the currently edited page is which page is in a graphical way. For example, as shown in FIG. 2, paging points 20 are displayed on the bottom of the position editing interface, and a number of the paging points 20 is equal to a total number of pages. As shown in FIG. 2, the embodiment includes 4 pages in total, and the currently displayed position editing interface is the position editing interface of page 1. Then the first paging point 20 may be filled, and other paging points 20 are not filled.

This implementation can show, by using paging points, the user which page is the current page.

The embodiment of this application has the same beneficial effects as the embodiment shown in FIG. 1, but the difference is that in the embodiment of this application, the index information of icons is edited on the position editing interface, so that the display positions of the plurality of icons can be edited on the position editing interface, or the display position of the same icon is adjusted for a plurality of times, so that the icon arrangement method is more convenient.

Figure 6:
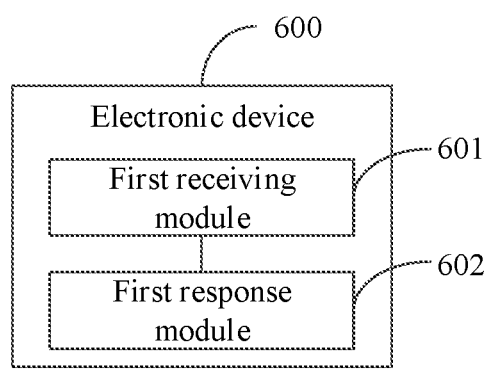
FIG. 6 is a structure diagram I of an electronic device according to an embodiment of this application.

Referring to FIG. 6, FIG. 6 is a structure diagram I of an electronic device according to an embodiment of this application. As shown in FIG. 6, the electronic device 600 includes:

a first receiving module 601, configured to receive a first input performed by a user in a case that a first icon is displayed; and a first response module 602, configured to display first index information of the first icon in response to the first input and update a display position of the first icon to a position corresponding to the first index information.

Optionally, the first receiving module 601 is configured to:

receive a first input performed by a user on second index information in a case that the first icon and the second index information are displayed, where the second index information is associated with a current display position of the first icon.

The first response module 602 is further configured to:

update the second index information to the first index information in response to the first input and update the display position of the first icon to the position corresponding to the first index information.

Optionally, the first index information includes at least one of a page identifier, a row identifier, a column identifier, an icon identifier, or a folder identifier.

Optionally, the first response module 602 is further configured to:

display a first row identifier of the first icon in response to the first input and update display positions of M first sub-icons displayed in a same row to positions corresponding to the first row identifier in a case that the first icon includes the M first sub-icons, where M is an integer greater than 1; and display a first column identifier of the first icon and update display positions of N first sub-icons displayed in a same column to positions corresponding to the first column identifier in a case that the first icon includes the N first sub-icons, where N is an integer greater than 1.

Optionally, the second index information includes a first folder identifier, and a display position corresponding to the second index information is located inside a first folder corresponding to the first folder identifier.

The first response module 602 is further configured to:

adjust the first folder identifier in the second index information in response to the first input, to obtain the first index information, where a display position corresponding to the first index information is outside the first folder.

Figure 7:
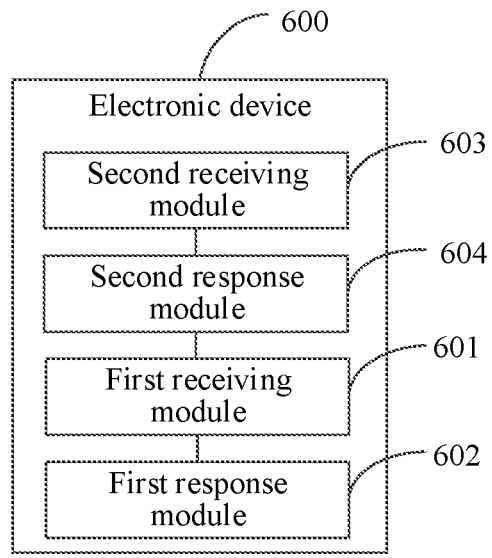
FIG. 7 is a structure diagram II of an electronic device according to an embodiment of this application.

Optionally, as shown in FIG. 7, the electronic device 600 further includes:

a second receiving module 603, configured to receive a second input performed by the user before receiving the first input performed by the user on the second index information in a case that the first icon and the second index information are displayed; and a second response module 604, configured to display a position editing interface in response to the second input, where the position editing interface includes the first icon and the second index information.

Figure 8:
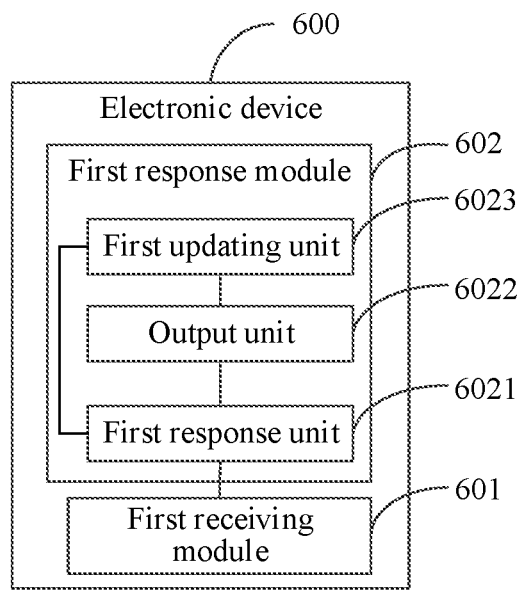
FIG. 8 is a structure diagram III of an electronic device according to an embodiment of this application.

Optionally, as shown in FIG. 8, the first response module 602 includes:

a first response unit 6021, configured to display third index information of the first icon in response to the first input;

an output unit 6022, configured to output prompt information in a case that a second icon is displayed at a display position corresponding to the third index information or the third index information corresponds to display positions of L first icons, where L is an integer greater than 1; and a first updating unit 6023, configured to update the third index information to the first index information and update the display position of the first icon to the position corresponding to the first index information.

Figure 9:
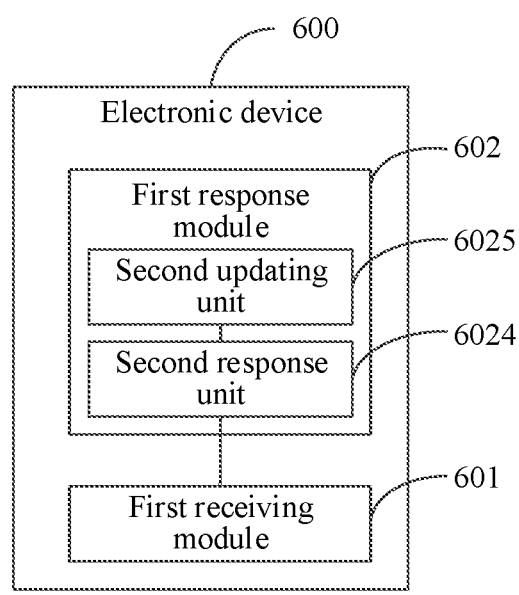
FIG. 9 is a structure diagram IV of an electronic device according to an embodiment of this application.

Alternatively, as shown in FIG. 9, the first response module 602 includes:

a second response unit 6024, configured to display the first index information of the first icon in response to the first input; and a second updating unit 6025, configured to adjust a display position of a second icon and update the display position of the first icon to the position corresponding to the first index information in a case that the second icon is displayed at a display position corresponding to the first index information.

The electronic device provided in the embodiment of this application can implement each process in the method embodiment as shown in FIG. 1 or FIG. 4, and can achieve the same beneficial effect. In order to avoid repetition, the details are not described herein again.

Figure 10:
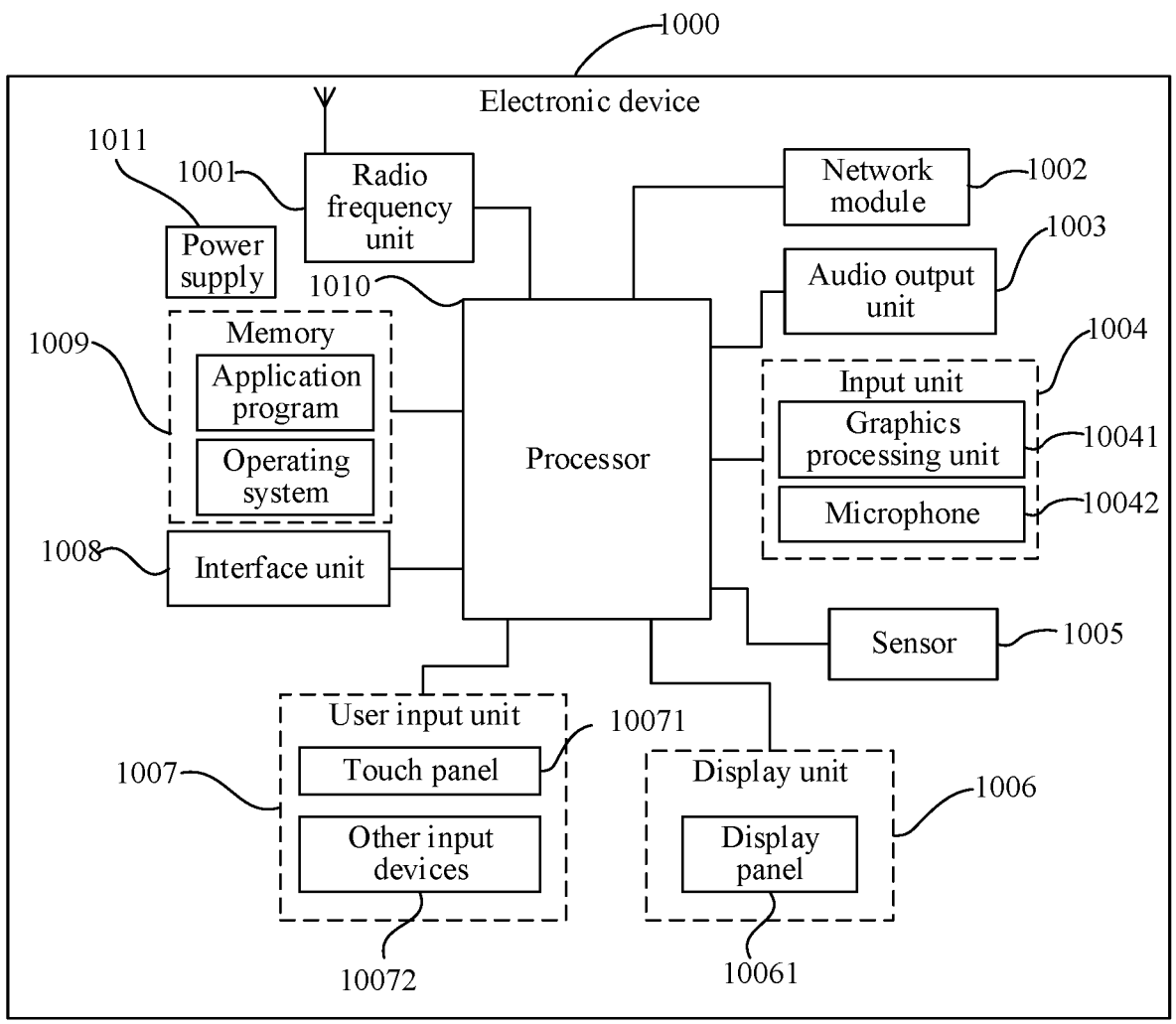
FIG. 10 is a schematic structural diagram of hardware of another electronic device according to an embodiment of this application.

Referring to FIG. 10, FIG. 10 is a schematic structural diagram of hardware of an electronic device according to an embodiment of this application.

The electronic device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, a power supply 1011, and the like. A person skilled in the art may understand that the electronic device structure shown in FIG. 10 does not constitute a limitation to the electronic device. The electronic device may include more or fewer components than those shown in the figure, or some components may be combined, or a different component deployment may be used. In the embodiment of this application, the electronic device includes, but is not limited to, a mobile phone, a tablet computer, a notebook computer, a palmtop computer, an onboard mobile terminal, a wearable device, a pedometer, a computer, and the like.

The user input unit 1007 is configured to receive a first input performed by a user in a case that the display unit 1006 displays a first icon.

The display unit 1006 is configured to display first index information of the first icon in response to the first input and update a display position of the first icon to a position corresponding to the first index information.

Optionally, the receiving, by the user input unit 1007, a first input performed by a user in a case that the display unit 1006 displays a first icon includes:

receiving a first input performed by a user on second index information in a case that the first icon and the second index information are displayed by the display unit 1006, where the second index information is associated with a current display position of the first icon.

The displaying, by the display unit 1006, first index information of the first icon in response to the first input and update a display position of the first icon to a position corresponding to the first index information includes:

updating, by the processor 1010, the second index information to the first index information in response to the first input, and controlling the display unit 1006 to update the display position of the first icon to the position corresponding to the first index information.

Optionally, the first index information includes at least one of a page identifier, a row identifier, a column identifier, an icon identifier, or a folder identifier.

Optionally, the displaying, by the display unit 1006, first index information of the first icon in response to the first input and update a display position of the first icon to a position corresponding to the first index information includes:

displaying a first row identifier of the first icon in response to the first input and updating display positions of M first sub-icons displayed in a same row to positions corresponding to the first row identifier in a case that the first icon includes the M first sub-icons, where M is an integer greater than 1; and displaying a first column identifier of the first icon and updating display positions of N first sub-icons displayed in a same column to positions corresponding to the first column identifier in a case that the first icon includes the N first sub-icons, where N is an integer greater than 1.

Optionally, the second index information includes a first folder identifier, and a display position corresponding to the second index information is located inside a first folder corresponding to the first folder identifier.

The updating, by the processor 1010, the second index information to the first index information in response to the first input includes:

adjusting the first folder identifier in the second index information in response to the first input, to obtain the first index information, where a display position corresponding to the first index information is outside the first folder.

Optionally, before receiving the first input performed by the user on the second index information in a case that the first icon and the second index information are displayed, the user input unit 1007 is further configured to receive a second input performed by the user.

The display unit 1006 is further configured to display a position editing interface in response to the second input, where the position editing interface includes the first icon and the second index information.

Optionally, the displaying first index information of the first icon in response to the first input and updating a display position of the first icon to a position corresponding to the first index information includes:

displaying, by the display unit 1006, third index information of the first icon in response to the first input;
    outputting, by the audio output unit 1003 or the display unit 1006, prompt information in a case that a second icon is displayed at a display position corresponding to the third index information or the third index information corresponds to display positions of L first icons, where L is an integer greater than 1;
    updating, by the display unit 1006, the third index information to the first index information, and updating the display position of the first icon to the position corresponding to the first index information;
    or
    displaying, by the display unit 1006, the first index information of the first icon in response to the first input; and
    adjusting, by the display unit 1006, a display position of a second icon, and updating the display position of the first icon to the position corresponding to the first index information in a case that the second icon is displayed at a display position corresponding to the first index information.

The electronic device 1000 provided in the embodiment of this application can simply move the display position of the icons displayed on the display screen, and has the same beneficial effect as the icon arrangement method provided in the embodiment of the present application. The details are not described herein again.

It should be understood that, in the embodiment of this application, the radio frequency unit 1001 may be configured to receive and transmit signals during transmission and receiving of information or in a call. Alternatively, downlink data is received from a base station and then processed by the processor 1010. In addition, uplink data is transmitted to the base station. Generally, the radio frequency unit 1001 includes, but is not limited to, an antenna, at least one amplifier, a transceiver, a coupler, a low noise amplifier, a duplexer, and the like. In addition, the radio frequency unit 1001 may further communicate with other devices through a wireless communication system and a network.

The electronic device provides a user with wireless broadband Internet access through the network module 1002, such as helping the user transmit and receive emails, browsing a web page, and access streaming media.

The audio output unit 1003 may convert, to an audio signal, audio data received by the radio frequency unit 1001 or the network module 1002 or stored in the memory 1009, and output the audio signal as sound. Moreover, the audio output unit 1003 may further provide audio output related to a specific function executed by the electronic device 1000 (for example, call signal reception sound, message reception sound, and the like). The audio output unit 1003 includes a speaker, a buzzer, a receiver, and the like.

The input unit 1004 is configured to receive audio or video signals. The input unit 1004 may include a graphics processing unit (Graphics Processing Unit, GPU) 10041 and a microphone 10042. The graphic processing unit 10041 is configured to process image data of a static picture or video obtained by an image capture device (such as a camera) in a video capture mode or an image capture mode. The processed image frame may be displayed on the display unit 1006. The image frame processed by the graphics processing unit 10041 may be stored in the memory 1009 (or other storage media) or transmitted via the radio frequency unit 1001 or the network module 1002. The microphone 10042 may receive sound and can process such sound into audio data. In a telephone call mode, the processed audio data may be converted to a format for output that is suitable for transmission by the radio frequency unit 1001 to a mobile communication base station.

The electronic device 1000 further includes at least one sensor 1005, such as an optical sensor, a motion sensor, and other sensors. Alternatively, the optical sensor includes an ambient light sensor and a proximity sensor. The ambient light sensor may adjust brightness of a display panel 10061 according to brightness of the ambient light, and the proximity sensor may turn off the display panel 10061 and/or backlight when the electronic device 1000 moves to an ear. As one type of the motion sensor, an accelerator sensor may detect a magnitude of acceleration in various directions (generally three axes), and may detect a magnitude and a direction of gravity when static, which may be configured to recognize gestures of the electronic device (such as horizontal and vertical screen switching, related games, and magnetometer posture calibration), vibration recognition related functions (such as pedometer and tap), and the like. The sensor 1005 may further include a fingerprint sensor, a pressure sensor, an iris sensor, a molecular sensor, a gyroscope, a barometer, a hygrometer, a thermometer, an infrared sensor, and the like, and the details are not described herein again.

The display unit 1006 is configured to display information inputted by the user or information provided to the user. The display unit 1006 may include a display panel 10061. The display panel 10061 may be configured in the form of a liquid crystal display (LCD), an organic light-emitting diode (OLED), or the like.

The user input unit 1007 may be configured to receive inputted digit or character information, and generate key signal inputs related to user setting and function control of an electronic device. Alternatively, the user input unit 1007 includes a touch panel 10071 and other input devices 10072. The touch panel 10071 is also referred to as a touch screen, which may be configured to collect a touch operation of the user on the touch panel or near the touch panel (for example, an operation on the touch panel 10071 or near the touch panel 10071 by a user by using any suitable object or accessory such as a finger, a stylus, and the like). The touch panel 10071 may include a touch detection device and a touch controller. The touch detection device is configured to detect a touch orientation of the user, detect a signal generated by the touch operation, and transmit the signal to the touch controller. The touch controller receives touch information from the touch detection device, converts the touch information to a contact coordinate, then transmits the contact coordinate to the processor 1010, and receives and executes a command transmitted by the processor 1010. In addition, a variety of types such as resistive, capacitive, infrared, and surface acoustic waves may be used for implementing the touch panel 10071. Except the touch panel 10071, the user input unit 1007 may further include other input devices 10072. Alternatively, other input devices 10072 may include but are not limited to a physical keyboard, a function button (such as a volume control button, a switch button, and the like), a trackball, a mouse, and a joystick, and the details are not described herein again.

Further, the touch panel 10071 may cover the display panel 10061. After the touch panel 10071 detects a touch operation on the touch panel or near the touch panel, the touch operation is transmitted to the processor 1010 to determine a type of a touch event, and then the processor 1010 provides corresponding visual output on the display panel 10061 according to the type of the touch event. In FIG. 10, the touch panel 10071 and the display panel 10061 are used as two independent components to implement the input and output functions of the electronic device, but in some embodiments, the touch panel 10071 and the display panel 10061 may be integrated to implement the input and output functions of the electronic device, which is not specifically limited herein.

The interface unit 1008 is an interface for an external device to connect to the electronic device 1000. For example, the external device may include a wired or wireless headset port, an external power supply (or a battery charger) port, a wired or wireless data port, a memory card port, a port for connecting a device with an identification module, an audio input/output (Input/Output, I/O) port, a video I/O port, a headset port, and the like. The interface unit 1008 may be configured to receive input (for example, data information, power, and so on) from the external device and transmit the received input to one or more elements within the electronic device 1000 or may be configured to transmit data between the electronic device 1000 and the external device.

The memory 1009 may be configured to store software programs and various data. The memory 1009 may mainly include a program storage area and a data storage area. The program storage area may store an operating system, an application program required for at least one function (such as a sound playback function and an image playback function), and the like. The data storage area may store data (such as audio data and a phone book) created according to the use of a mobile phone, and the like. In addition, the memory 1009 may include a high speed random access memory, and may further include a non-volatile memory, such as at least one magnetic disk storage device, a flash memory device or other non-volatile solid state storage devices.

The processor 1010 is a control center of the electronic device, which connects various parts of the entire electronic device by using various interfaces and lines, and executes various functions of the electronic device and processes data by running or executing software programs and/or modules stored in the memory 1009, and calling data stored in the memory 1009, thereby performing overall monitoring on the electronic device. The processor 1010 may include one or more processing units. Preferably, the processor 1010 may integrate an application processor and a modem processor. The application processor mainly processes an operating system, a user interface, an application program, and the like, and the modem processor mainly processes wireless communication. It may be understood that the foregoing modem processor may not be integrated into the processor 1010.

The electronic device 1000 may further include a power supply 1010 (such as a battery) that supplies power to various components. Preferably, the power supply 1010 may be logically connected to the processor 1010 through a power management system, so that functions such as charging, discharging, and power management may be managed through the power management system.

In addition, the electronic device 1000 includes some functional modules that are not shown, and the details are not described herein again.

Preferably, an embodiment of this application further provides an electronic device. The electronic device includes a processor 1010, a memory 1009, a computer program stored in the memory 1009 and executable on the processor 1010. The computer program, when executed by the processor 1010, causes the processes of the embodiments of the icon arrangement method to be implemented, and can achieve the same technical effect. In order to avoid repetition, the details are not described herein again.

It should be noted that the terms "include", "comprise", or any other variants thereof in this specification are intended to cover a non-exclusive inclusion, so that a process, method, object, or apparatus including a series of elements not only include those elements, but also include other elements which are not clearly listed, or include inherent elements of the process, method, object, or apparatus. Without more limitations, elements defined by the sentence "including one" does not exclude that there is still another same element in the process, method, object, or apparatus including the element.

A person of ordinary skill in the art may be aware that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but such implementation is not to be considered beyond the scope of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the embodiments provided in this application, it should be understood that the disclosed apparatus, and method may be implemented in other manners. For example, the apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate components may or may not be physically separate, and components displayed as units may or may not be physical units, and may be located in one position, or may be distributed on a plurality of network units. Some of or all of the units may be selected according to actual needs to achieve the objectives of the solutions in the embodiments.

In addition, functional units in the embodiments of the present disclosure may be integrated into one processing unit, or each of the units may exist alone physically, or two or more units are integrated into one unit.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of this application essentially or the part contributing to the prior art may be embodied in a form of a software product. The computer software product is stored in a storage medium (such as a ROM/RAM, a magnetic disk, or an optical disc) and includes several instructions to enable an electronic device (which may be a mobile phone, a computer, a server, an air conditioner, a network device, or the like) to perform the methods described in the embodiments of this application.

A person of ordinary skill in the art may understand that all or some of the processes of the methods in the embodiments may be implemented by a computer program controlling relevant hardware. The program may be stored in a computer-readable storage medium. When the program is executed, processes of the foregoing method embodiments may be included. The storage medium may be a magnetic disc, an optical disc, a read-only memory (ROM), a random access memory (RAM), or the like.

It may be understood that, the embodiments described in the embodiments of the present disclosure may be implemented by using hardware, software, firmware, middleware, microcode, or a combination thereof. For implementation by hardware, a module, a unit, a sub unit may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a micro-controller, a microprocessor, and other electronic units configured to execute the functions described in the present disclosure, or a combination thereof.

For implementation by software, the technologies in the embodiments of the present disclosure may be implemented by performing the functional modules (for example, a process and a function) in the embodiments of the present disclosure. Software code may be stored in a memory and executed by a processor. The memory may be implemented inside or outside the processor.

The embodiments of this application are described above with reference to the accompanying drawings. However, this application is not limited to the foregoing specific implementations. The foregoing specific implementations are only exemplary and not limitative. Enlightened by this application, a person of ordinary skill in the art may further make many variations without departing from the idea of this application and the protection scope of the claims. All of the variations fall within the protection scope of this application.

What is claimed is:

1. An icon arrangement method, comprising:
receiving a first input performed by a user on second index information in a case that a first icon and the second index information are displayed, wherein the second index information is associated with a current display position of the first icon; and
updating the second index information to first index information in response to the first input and updating the display position of the first icon to a position corresponding to the first index information.

2. The method according to claim 1, wherein the first index information comprises at least one of a page identifier, a row identifier, a column identifier, an icon identifier, or a folder identifier.

3. The method according to claim 2, wherein the updating the second index information to the first index information in response to the first input and updating the display position of the first icon to the position corresponding to the first index information comprises:
displaying a first row identifier of the first icon in response to the first input and updating display positions of M first sub-icons displayed in a same row to positions corresponding to the first row identifier in a case that the first icon comprises the M first sub-icons, wherein M is an integer greater than 1; and displaying a first column identifier of the first icon and updating display positions of N first sub-icons displayed in a same column to positions corresponding to the first column identifier in a case that the first icon comprises the N first sub-icons, wherein N is an integer greater than 1.

4. The method according to claim 1, wherein the second index information comprises a first folder identifier, and a display position corresponding to the second index information is inside a first folder corresponding to the first folder identifier; and
the updating the second index information to the first index information in response to the first input comprises:
adjusting the first folder identifier in the second index information in response to the first input, to obtain the first index information, wherein a display position corresponding to the first index information is outside the first folder.

5. The method according to claim 1, wherein before the receiving a first input performed by a user on second index information in a case that the first icon and the second index information are displayed, the method further comprises:

receiving a second input performed by the user; and displaying a position editing interface in response to the second input, wherein the position editing interface comprises the first icon and the second index information.

6. The method according to claim 1, wherein the updating the second index information to the first index information in response to the first input and updating the display position of the first icon to the position corresponding to the first index information comprises:

displaying third index information of the first icon in response to the first input; displaying a second icon at a display position corresponding to the third index information, or outputting prompt information in a case that the third index information corresponds to display positions of L first icons, wherein L is an integer greater than 1; and updating the third index information to the first index information and updating the display position of the first icon to the position corresponding to the first index information;

or displaying the first index information of the first icon in response to the first input; and adjusting a display position of a second icon and updating the display position of the first icon to the position corresponding to the first index information in a case that the second icon is displayed at the display position corresponding to the first index information.

7. An electronic device, comprising:

a processor; and a memory storing a computer program that is executable on the processor, wherein the computer program, when executed by the processor, causes the electronic device to perform the following steps:

receiving a first input performed by a user on second index information in a case that a first icon and the second index information are displayed, wherein the second index information is associated with a current display position of the first icon; and updating the second index information to first index information in response to the first input and updating the display position of the first icon to a position corresponding to the first index information.

8. The electronic device according to claim 7, wherein the first index information comprises at least one of a page identifier, a row identifier, a column identifier, an icon identifier, or a folder identifier.

9. The electronic device according to claim 8, wherein the updating the second index information to the first index information in response to the first input and updating the display position of the first icon to the position corresponding to the first index information comprises:

displaying a first row identifier of the first icon in response to the first input and updating display positions of M first sub-icons displayed in a same row to positions corresponding to the first row identifier in a case that the first icon comprises the M first sub-icons, wherein M is an integer greater than 1; and displaying a first column identifier of the first icon and updating display positions of N first sub-icons displayed in a same column to positions corresponding to the first column identifier in a case that the first icon comprises the N first sub-icons, wherein N is an integer greater than 1.

10. The electronic device according to claim 7, wherein the second index information comprises a first folder identifier, and a display position corresponding to the second index information is inside a first folder corresponding to the first folder identifier; and the updating the second index information to the first index information in response to the first input comprises:

adjusting the first folder identifier in the second index information in response to the first input, to obtain the first index information, wherein a display position corresponding to the first index information is outside the first folder.

11. The electronic device according to claim 7, wherein before the receiving a first input performed by a user on second index information in a case that the first icon and the second index information are displayed, the computer program, when executed by the processor, causes the electronic device to further perform the following steps:

receiving a second input performed by the user; and displaying a position editing interface in response to the second input, wherein the position editing interface comprises the first icon and the second index information.

12. The electronic device according to claim 7, wherein the updating the second index information to the first index information in response to the first input and updating the display position of the first icon to the position corresponding to the first index information comprises:

displaying third index information of the first icon in response to the first input; displaying a second icon at a display position corresponding to the third index information, or outputting prompt information in a case that the third index information corresponds to display positions of L first icons, wherein L is an integer greater than 1; and updating the third index information to the first index information and updating the display position of the first icon to the position corresponding to the first index information;

or displaying the first index information of the first icon in response to the first input; and adjusting a display position of a second icon and updating the display position of the first icon to the position corresponding to the first index information in a case that the second icon is displayed at the display position corresponding to the first index information.

13. A non-transitory computer-readable storage medium, having a computer program stored thereon, wherein the computer program, when executed by a processor, performs the following steps:

receiving a first input performed by a user on second index information in a case that a first icon and the second index information are displayed, wherein the second index information is associated with a current display position of the first icon; and updating the second index information to first index information in response to the first input and updating the display position of the first icon to a position corresponding to the first index information.

14. The non-transitory computer-readable storage medium according to claim 13, wherein the first index information comprises at least one of a page identifier, a row identifier, a column identifier, an icon identifier, or a folder identifier.

15. The non-transitory computer-readable storage medium according to claim 14, wherein the updating the second index information to the first index information in response to the first input and updating the display position of the first icon to the position corresponding to the first index information comprises:

displaying a first row identifier of the first icon in response to the first input and updating display positions of M first sub-icons displayed in a same row to positions corresponding to the first row identifier in a case that the first icon comprises the M first sub-icons, wherein M is an integer greater than 1; and displaying a first column identifier of the first icon and updating display positions of N first sub-icons displayed in a same column to positions corresponding to the first column identifier in a case that the first icon comprises the N first sub-icons, wherein N is an integer greater than 1.

16. The non-transitory computer-readable storage medium according to claim 13, wherein the second index information comprises a first folder identifier, and a display position corresponding to the second index information is inside a first folder corresponding to the first folder identifier; and the updating the second index information to the first index information in response to the first input comprises:

adjusting the first folder identifier in the second index information in response to the first input, to obtain the first index information, wherein a display position corresponding to the first index information is outside the first folder.

17. The non-transitory computer-readable storage medium according to claim 13, wherein before the receiving a first input performed by a user on second index information in a case that the first icon and the second index information are displayed, the computer program, when executed by the processor, further performs the following steps:

receiving a second input performed by the user; and displaying a position editing interface in response to the second input, wherein the position editing interface comprises the first icon and the second index information.

18. The non-transitory computer-readable storage medium according to claim 13, wherein the updating the second index information to the first index information in response to the first input and updating the display position of the first icon to the position corresponding to the first index information comprises:

displaying third index information of the first icon in response to the first input; displaying a second icon at a display position corresponding to the third index information, or outputting prompt information in a case that the third index information corresponds to display positions of L first icons, wherein L is an integer greater than 1; and updating the third index information to the first index information and updating the display position of the first icon to the position corresponding to the first index information;

or displaying the first index information of the first icon in response to the first input; and adjusting a display position of a second icon and updating the display position of the first icon to the position corresponding to the first index information in a case that the second icon is displayed at the display position corresponding to the first index information.

\* \* \* \* \*